July 14, 1970    C. W. SCHOLL ET AL    3,520,755
APPARATUS FOR MAKING HEAT SEALED ARTICLES
Filed Jan. 4, 1967
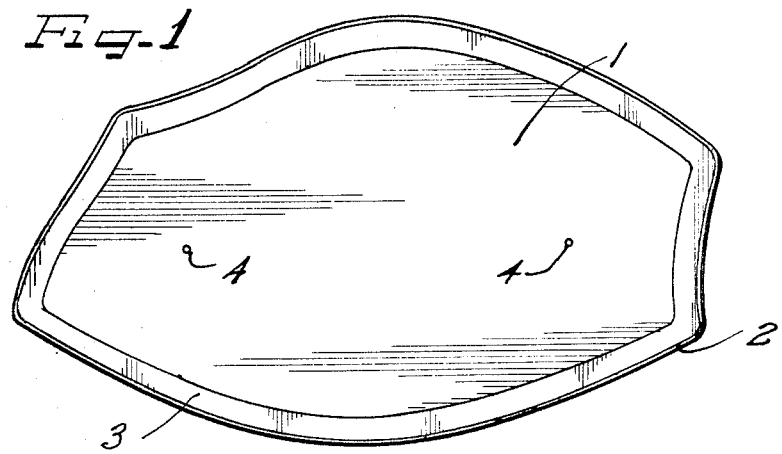
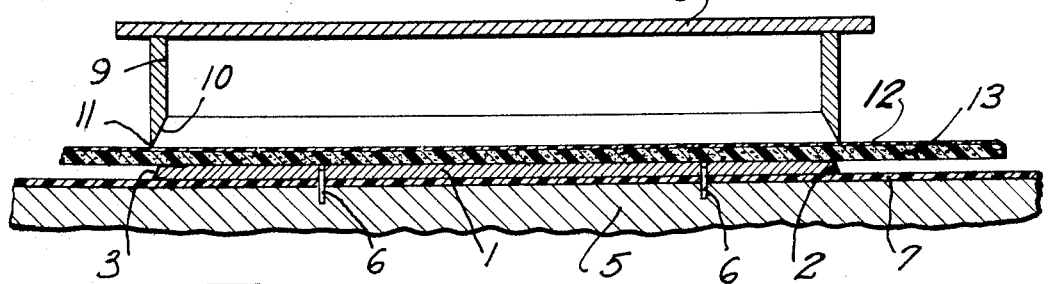
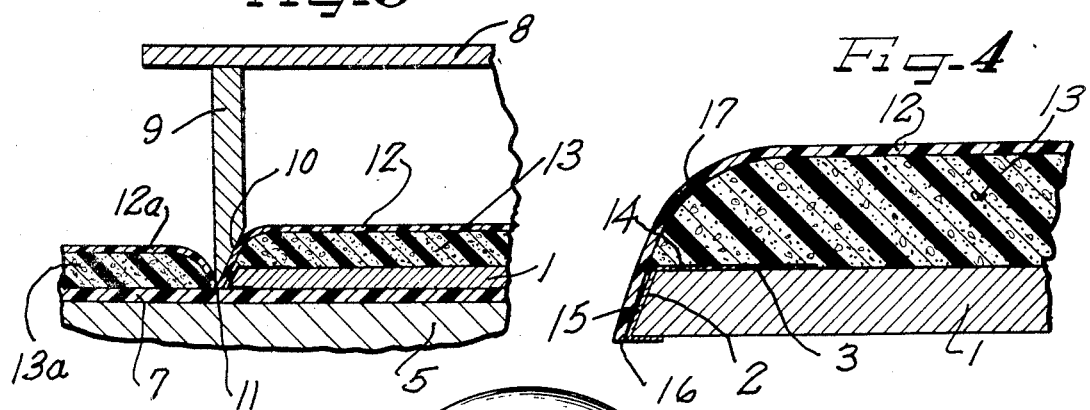
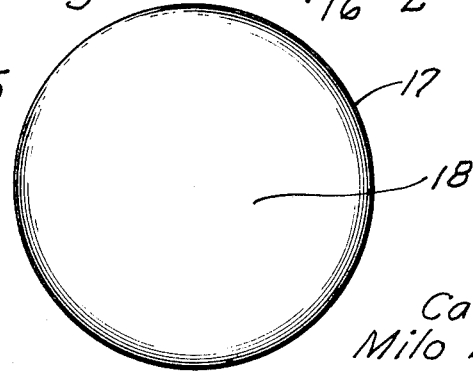
INVENTOR.
Carl W. Scholl
Milo L. Raffaelli, Sr.
BY  ATTORNEYS

United States Patent Office 3,520,755
Patented July 14, 1970

3,520,755
APPARATUS FOR MAKING HEAT SEALED ARTICLES
Carl W. Scholl and Milo L. Raffaelli, Sr., Chicago, Ill., assignors to The Scholl Mfg. Co., Inc., Chicago, Ill., a corporation of New York
Filed Jan. 4, 1967, Ser. No. 607,247
Int. Cl. B29c *19/02*
U.S. Cl. 156—380          5 Claims

ABSTRACT OF THE DISCLOSURE

This invention relates to an apparatus for electronically heat sealing a thermoplastic flexible cover to a more rigid backing member to form a panel-like article.

BACKGROUND OF THE INVENTION

Field of the invention

The instant invention relates to die means for and a method of making panel-like members which may be used as insoles for articles of footwear, wall panels, furniture panels, stool and chair seats and backs, vehicle interior panels and in many other ways, the resultant article comprising a flexible thermoplastic cover sheet electronically heat sealed to a more rigid backing member in such a manner as to completely protect the front or upper face of the backing member as well as the side edge of the backing member, the heat seal seam being over and the cover bonded to the side or bounding edge of the backing member. One stroke of the die results in the completion of the article since the dies make a heat and tear seal seam permitting easy removal of waste stock. Most frequently, a layer of cushioning material is interposed between the cover and the backing member.

Description of the prior art

Heretofore, die means have been employed and methods used in the making of similar panel members embodying the electronic heat sealing of a thermoplastic cover to a more rigid backing member. However, with these previously known die means and with the methods formerly employed, the cover was heat sealed only to the front face of the backing member and the heat and tear seal seam left an unsightly heat seal seam around the margin of the covered face of the backing member, and the edge of the backing member was left totally exposed. In many cases, therefore, it was necessary to paint or otherwise color the exposed edge of the backing member to match the color of the cover, and regardless of how much care was exercised in this process it was virtually impossible to obtain a true color match. Regardless of the coloring of the backing member edge, that edge was still left exposed particularly in the case of insoles for articles of footwear, to the adverse effects of moisture including natural moisture, perspiration, and the like and, in objectionably short intervals frequently deteriorated by virtue of delamination, accumulation of dirt, etc. The prior art endeavors in the field of panel-like articles fail to provide a cover connection to the backing member such as to conceal the backing member from view when in use and to fully protect that backing member including the edge thereof from the adverse effects of moisture and dirt.

SUMMARY

The apparatus and method involved in the instant invention when utilized and practiced produce a panel-like article in which a thermoplastic cover member is heat sealed to the margin of one face of a more rigid backing member and also to the side edge of the backing member so as to completely cover and conceal the backing member except for its under or rear face by means of which the panel-like article is adhesively attached to a surface to be covered. The instant invention therefore clearly solves the problems existing in the prior art as mentioned above. And the use and practice of the instant invention result in a panel-like article which is more pleasing to the eye than such articles produced heretofore, which totally and effectively conceals and protects a backing member and which eliminates the operation of coloring the edge of the backing member to correspond with that of the cover. The edge of the backing member is preferably provided with a slope or bevel, and the upper die has an interior formation that is the counterpart of that bevel in order to have the electric charge passing through the die effective to form a heat seal both downwardly and laterally to completely unite and bond the cover member to the edge of the backing member and leaving no unsightly heat seal seam whatever.

BRIEF DESCRIPTION OF THE DRAWING

FIG. 1 is a top plan view of a preformed backing member, and illustrating the shape of the resultant article;

FIG. 2 is a fragmentary vertical sectional view through the heat sealing dies, with the backing member in position thereon, and the apparatus assembled ready for heat sealing operation;

FIG. 3 is an enlarged fragmentary showing of the left-hand portion of FIG. 2 but showing the dies in heat sealing position;

FIG. 4 is a greatly enlarged fragmentary sectional view through a finished article; and FIG. 5 is a plan view of a finished article of different shape, but also made by using the apparatus and method of the instant invention.

DESCRIPTION OF THE PREFERRED EMBODIMENT

It will be appreciated that the apparatus involved in the instant invention or discovery may be shaped so as to provide an article of substantially any desirable size and of any desirable contour, depending upon the use intended for the resultant panel-like article. The method is the same regardless of the size and contour of the resultant article.

By way of example, the apparatus and method herein involved will be described in connection with the making of a panel-like article in the form of a half insole for footwear. The resultant article will have the same contour as a backing member 1, seen clearly in FIG. 1. This backing member 1 may be made of any suitable material, depending upon the use intended for the article. For insoles for footwear, the material may satisfactorily be leather or the equivalent or a highly satisfactory material such as fiberboard impregnated with latex or another suitable substance to render the same elastomeric so that the backing member will not cup, harden, crack or lose its shape during usage. In the case of wall and furniture panels and the like, a wooden baking member might also be used if desired.

The backing member 1 is first preformed or precut in the desired contour and is provided with a sloping or beveled bounding edge 2, a satisfactory slope being approximately 24° from the vertical, the slope being downwardly and outwardly. The marginal portion of the backing member is provided with a stripe 3 of vinyl, acetate, or some other compatible material that responds to electronic heat sealing with another thermoplastic substance, a vinyl cement being highly satisfactory. The stripe 3 extends on the upper face of the backing member, downwardly over the bevel edge 2, and partially underneath the backing member on the opposite face thereof, this latter portion not being necessary but is only provided to insure that the bevel is completely covered. This stripe 3 may be applied by painting, spraying, dipping or in any other suitable manner, and when applied becomes dry and is relatively invisible. The stripe is also of such thinness as not to interfere with proper mounting of the backing member on a surface to be covered by the resultant article and requires no particular care in its application, it being only essential that there be such material on a part of the upper or outer face of the backing member and fully over the bevel edge 2, any excess of bonding material being of no moment whatever in the finished article. Also, when the backing member 1 is preformed it is provided with a pair of spaced apertures 4—4, so that it may be accurately positioned on a die member. The opposed faces of the backing member are preferably flat and parallel.

The heat sealing apparatus includes a lower die 5 which is preferably in the form of a flat electrically conductive plate. Extending upwardly from this plate are a pair of pins 6—6 of non-conductive material which are sized to fit the apertures 4—4 in the preformed backing member. While not essential in all cases, it is frequently desirable to utilize a buffer sheet or plate 7 on top of the die 5 to prevent any possibility of melted heat seal material from sticking to the face of the die. The buffer plate is a dielectric and a highly satisfactory material for that plate is polytetrafluoroethylene.

The apparatus also includes an upper die of electrically conductive material, this die embodying a base 8 from which a skirt 9 depends, the skirt having an outline in accordance with the desired contour of the resultant article. In the illustrated instance, the skirt would have a shape so as to intimately fit around the backing member 1. It will be noted that the skirt has an inner bevel 10 which is the counterpart of the bevel 2 on the backing member and the skirt terminates in a knife edge 11 at the bottom of the bevel.

Both dies are mounted in a known form of press equipped with means to pass a charge of ultra high frequency electric current from one die to the other to effect a heat seal seam. Pressure on the upper die which usually reciprocates vertically relatively to the lower die will cause the knife edge 11 to make the resultant seam both a heat and tear seal seam so that waste stock may be easily removed from the resultant article.

In the illustrated instance, the resultant article includes a cover 12 which is a comparatively thin sheet of thermoplastic material responsive to electronic heat sealing with another compatible substance. A vinyl sheet is highly satisfactory for this purpose, and preferably in the instance of an insole for footwear an expanded vinyl sheet is utilized because of its pleasing grained appearance, its extreme durability, and the fact that it offers a pleasing feel to the foot of the user. In many cases it is desirable to utilize a thicker layer 13 of cushioning material between the cover and the backing member. This layer 13 need not essentially be of heat sealable material, but thermoplastic foams that are heat sealable afford an excellent cushioning medium. Such foams are vinyl foam, urethane foam, a foam comprising a urethane skeleton impregnated with vinyl, and others. The cover 12 and cushioning layer 13 may be in the form of a laminate with the cover and cushioning material bonded together in face-to-face relationship, or they may be individual sheets not connected to each other until after the heat seal seam has been made. Each has its advantages in manufacture depending upon circumstances. For example, the laminate is much easier to handle particularly where there is a large order for like articles of the same color. Where special orders are requested asking for numerous colors of articles, it may be desirable to utilize separate sheets so that the foam material may be of the same color while the desired variances in color would be embodied only in the separate cover sheets, thereby saving storage space and lessening the value of the inventory on hand. In either event, both the cover and foam layer are preferably sheets of indefinite size from which a large number of articles may be made.

In making the panel-like article, the free form backing member is disposed on the buffer 7, if the same is used, resting on the die 5, over the pins 6—6 projecting from the die, thus positioning the backing member in direct alignment with the upper die. Over the backing member 1 the foam layer 13 and cover 12 are disposed in superposed relationship as seen in FIG. 2. Then, the upper die is brought down under pressure until the knife edge 11 on the skirt of the upper die substantially contacts the buffer plate 7 on the lower die. The travel of the die may readily be governed in presses of a known character to stop the die at a desired location. Bringing down the upper die folds the foam layer and cover over the side edge of the backing member, gradually compressing the foam layer toward the lower face of the backing member by virtue of the relatively intimate fit between the skirt of the upper die and the backing member. When the die reaches the position seen in FIG. 3, a charge of ultra high frequency current is passed through the skirt of the upper die and that current travels into the lower die 5 during which a part of the foam layer if the same is of heat sealable material becomes fused both to the cover and to the stripe 3 of heat sealable material on the marginal portion of the backing member, that portion of the foam material involved in the heat seal seam being gradually reduced in thickness toward the lower face of the backing member. The charge of electric power, being only needed for a very short duration, melts and fuses the cover, possibly the foam layer, and the stripe 3 on the backing member into a positive heat seal seam which may be effective partially on the upper face of the backing member as indicated at 14 in FIG. 4, and which is clearly effective over the entire side edge of the backing member as indicated at 15. When the heat seal seam is completed the cover will extend completely to the lower face of the backing member as indicated at 16 in FIG. 4 and may be thickened a trifle at the point 16.

However, the result is a smooth curvature of the cover 12, as indicated at 17, from the upper level of the heat sealed article downwardly to the rear face of the backing member, there being no unsightly visible heat seal seam occurring anywhere, and the backing member is fully protected by the cover, and the operation heretofore necessary of painting the edge of the backing member to correspond in color to the cover has been totally eliminated. The resultant product is more pleasing to the eye, more durable, and the backing member is effectively protected.

In FIG. 5 we have shown a panel member 18 made as above described, but in this instance being in the form of a cover for the seat of a stool, merely to indicate that the invention is actually as versatile as above set forth. It will be noted that the stool has an exceedingly pleasing appearance by virtue of the curve 17 where the cover and possibly the cushioning material is heat sealed directly over the edge of the backing member.

In the making of the heat seal seam, the temperature developed in the respective parts is effective not only in a vertical direction, but also in a somewhat horizontal direction and the ease with which the seam may be established entirely over the edge of the backing member is augmented by virtue of the bevel 2 on the backing member and the corresponding slope 10 in the skirt of the upper die.

It will be understood that modifications and variations may be effected without departing from the scope of the novel concepts of the present invention.

We claim as our invention:

1. Apparatus for use in an electronic heat sealing press for heat sealing thermoplastic cover material to the side edge of a precut more rigid backing member having a stripe of compatible heat sealable material over the side edge thereof, embodying a flat lower electrode die on which the backing member is placed, and wherein the improvement comprises:

an upper electrode die including a base, and a conductive skirt depending from said base to a depth materially exceeding the thickness of the backing member and cover material thereon and through which ultra high frequency current may be passed toward the lower die, said skirt having an interior shape at the lower end thereof to receive therein the backing member with the cover material folded over the entire side edge thereof.

2. The apparatus of claim 1, wherein:

the side edge of the backing member is bevelled, and said upper die has an internal complemental bevel.

3. The apparatus of claim 2, wherein the bevel on the backing member and the bevel inside the upper die are each approximately 24 degrees from the vertical.

4. The apparatus of claim 1, wherein said lower die has an upstanding dielectric pin to enter an aperture in said backing member for properly positioning the same.

5. The apparatus of claim 1, wherein said lower die has a pair of upstanding dielectric pins to properly position said backing member.

References Cited

UNITED STATES PATENTS

| | | | |
|---|---|---|---|
| 2,782,544 | 2/1957 | Tobin | 156—212 X |
| 3,013,919 | 12/1961 | Bialy | 156—212 X |
| 3,052,587 | 9/1962 | Spieles | 156—273 X |
| 3,094,716 | 6/1963 | Friedman | 156—212 X |
| 3,237,278 | 3/1966 | White | 156—212 X |
| 3,270,394 | 9/1966 | Marsh et al. | 156—212 X |
| 3,378,423 | 4/1968 | Polk et al. | 156—273 |
| 3,382,124 | 5/1968 | Briskey | 156—212 X |
| 3,389,033 | 6/1968 | Ullman | 156—212 X |
| 3,419,458 | 12/1968 | Brooks et al. | 156—273 X |

CARL D. QUARFORTH, Primary Examiner

S. J. LECHERT, JR., Assistant Examiner

U.S. Cl. X.R.

156—199, 216, 223, 250, 251, 256, 267, 270, 272, 273, 443, 459, 468, 475, 515, 530